(12) United States Patent
Fan et al.

(10) Patent No.: US 6,744,836 B2
(45) Date of Patent: Jun. 1, 2004

(54) APPARATUS, COMPUTER READABLE MEDIUM, TRANSMISSION MEDIUM, AND METHOD FOR SYNCHRONIZING A RECEIVED SIGNAL BASED ON A MAXIMUM LIKELIHOOD PRINCIPLE USING A BISECTION TECHNIQUE

(75) Inventors: Yigang Fan, Germantown, MD (US); Prakash Chakravarthi, Germantown, MD (US)

(73) Assignee: Comsat Corporation, Clarksburg, MD (US)

( * ) Notice: Subject to any disclaimer, the term of this patent is extended or adjusted under 35 U.S.C. 154(b) by 0 days.

(21) Appl. No.: 09/850,080

(22) Filed: May 8, 2001

(65) Prior Publication Data

US 2003/0021364 A1 Jan. 30, 2003

(51) Int. Cl.[7] .................................................. H04L 7/04
(52) U.S. Cl. .................... 375/362; 375/341; 370/509
(58) Field of Search ................................ 375/341, 367, 375/362, 365, 371, 355; 370/509, 512, 515, 516

(56) References Cited

U.S. PATENT DOCUMENTS

| | | | |
|---|---|---|---|
| 5,363,412 A | | 11/1994 | Love et al. |
| 5,440,597 A | * | 8/1995 | Chung et al. ............... 375/200 |
| 5,963,603 A | | 10/1999 | Li et al. |
| 6,002,729 A | * | 12/1999 | Schmidt ..................... 375/364 |
| 6,097,776 A | * | 8/2000 | Mesiwala ................... 375/355 |
| 6,359,878 B1 | * | 3/2002 | Lakkis et al. ............... 370/350 |
| 6,442,219 B1 | | 8/2002 | Bertrand et al. |

* cited by examiner

*Primary Examiner*—Phuong Phu
(74) *Attorney, Agent, or Firm*—Sughrue Mion, PLLC

(57) ABSTRACT

The present invention relates to burst mode digital communication systems where data transmission is preceded by a preamble for acquisition of carrier and clock synchronization using maximum likelihood (ML) principle. The preamble is sampled and the set of samples obtained is processed using the optimization algorithms of the present invention to provide the ML timing estimate. The optimization algorithms in the present invention consist of three parts. The first part deals with isolating the desired optimal estimate from non-optimal extremes satisfying the same necessary condition, and provides the initial conditions for activating the binary search schemes. The second part performs the binary search for the optimal timing estimate that guarantees the convergence. On the basis of the obtained iterative sequence, the last part constructs a more rapidly convergent sequence to obtain the ML symbol timing estimate. Using the obtained symbol timing estimate, the ML carrier phase estimate can be computed explicitly, and synchronization performed.

16 Claims, 3 Drawing Sheets

Method for Synchronizing a Received Signal Using a Maximum-Likelihood Principle Based on a Bisection Technique

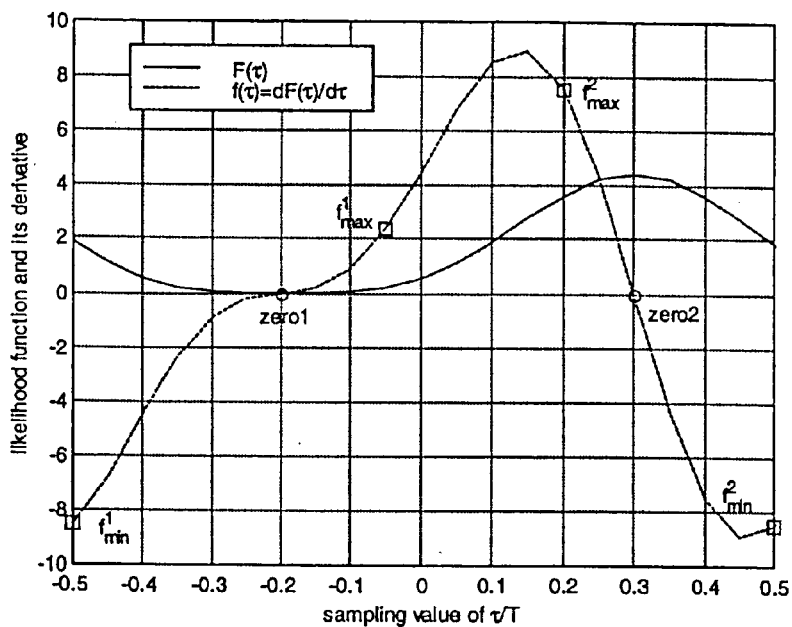
Figure 1. Likelihood function and its derivative for signal with $\tau_{ML}/T = 0.3$
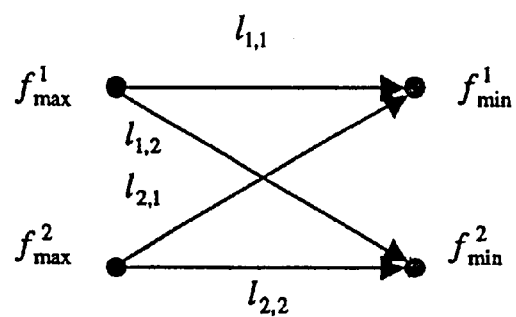
Figure 2. Butterfly for isolating ML estimate from non-optimal extremes

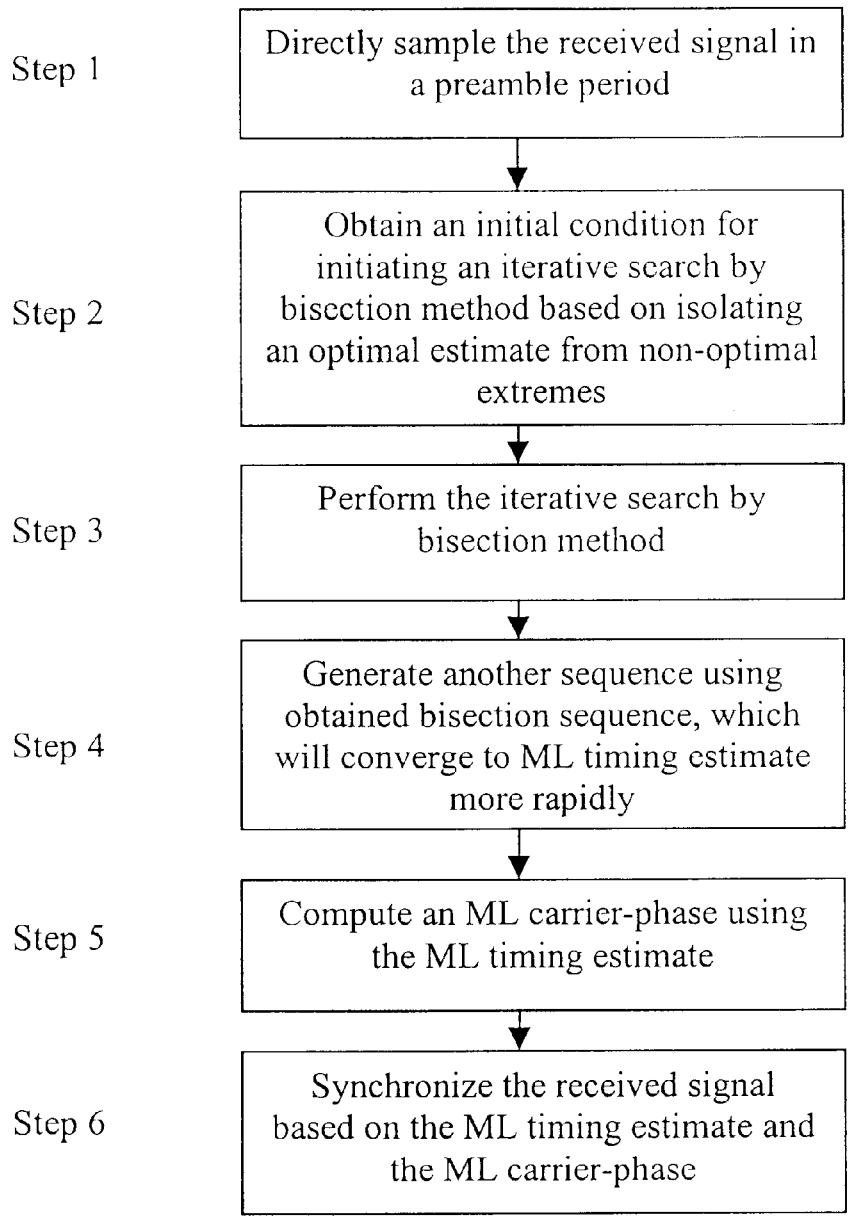
Figure 3. Method for Synchronizing a Received Signal Using a Maximum-Likelihood Principle Based on a Bisection Technique

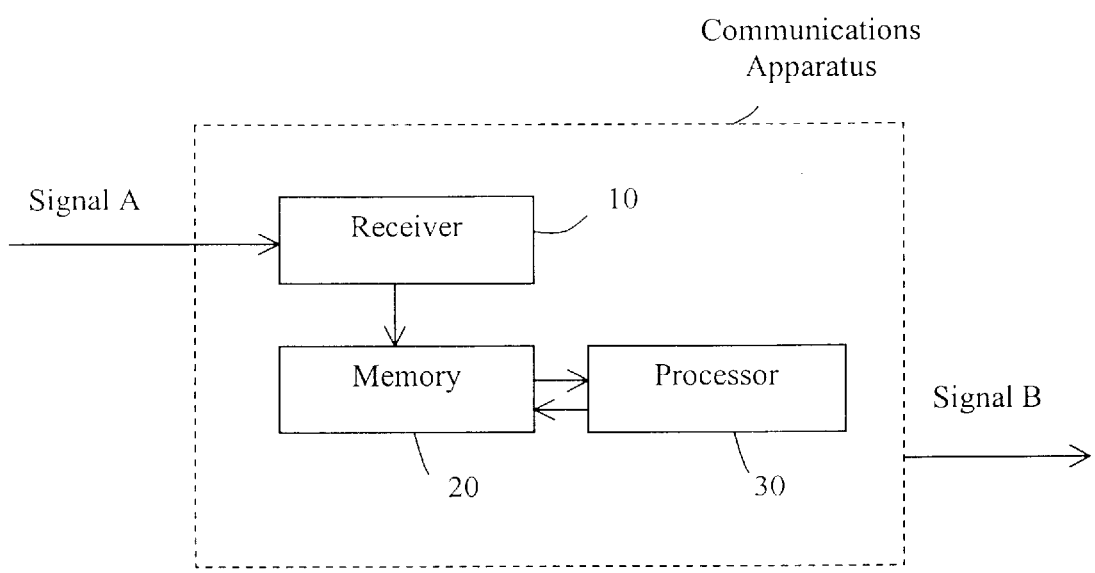
Figure 4. Communications Apparatus for Synchronizing a Received Signal, including Receiver, Processor, and Memory

APPARATUS, COMPUTER READABLE MEDIUM, TRANSMISSION MEDIUM, AND METHOD FOR SYNCHRONIZING A RECEIVED SIGNAL BASED ON A MAXIMUM LIKELIHOOD PRINCIPLE USING A BISECTION TECHNIQUE

BACKGROUND OF THE INVENTION

1. Field of Invention

The present invention relates to an apparatus, computer readable medium, transmission medium, and method for achieving bit timing synchronization of a received signal based on a maximum likelihood (ML) principle using a bisection technique. The invention is applicable to, for example, burst mode digital communication systems where data transmission is preceded by a preamble for acquisition of carrier and clock synchronization using the maximum likelihood principle.

2. Related Art

In burst mode digital communications, data transmissions are often preceded by a preamble consisting of L symbols to provide the rapid acquisition of both carrier and clock synchronization. Where the transmission utilizes M-ary PSK modulation, maximum likelihood symbol synchronization can be obtained by maximizing the following equivalent log-likelihood function $F(\tau)$ based on the received signal samples during preamble period, $$F(\tau)=[A(\tau)]^2+[B(\tau)]^2 \quad (1)$$

where $A(\tau)$ and $B(\tau)$ are given as $$A(\tau) = \sum_{n=0}^{L-1} [y_R(nT+\tau)\cos\theta_n + y_I(nT+\tau)\sin\theta_n] \quad (2)$$

$$B(\tau) = \sum_{n=0}^{L-1} [-y_R(nT+\tau)\sin\theta_n + y_I(nT+\tau)\cos\theta_n] \quad (3)$$

In Eqs. 2 and 3, $y_R(nT+\tau)$ and $y_I(nT+\tau)$ are the received signal samples of the nth symbol, taken at instant $nT+\tau$ at the outputs of the matched filters in the in-phase and quadrature dimensions, respectively. $\theta_n$ is the phase of nth symbol of the preamble, determined from the MPSK constellation.

The necessary conditions for the estimates of $\tau$ to be the maximum likelihood estimates requires that the partial derivative of likelihood function (1) with respect to the timing parameter be equal to zero:

$$f(\hat{\tau}_{ML}) = \left[A(\tau)\frac{\partial A(\tau)}{\partial \tau} + B(\tau)\frac{\partial B(\tau)}{\partial \tau}\right]_{\tau=\hat{\tau}_{ML}} = 0 \quad (4)$$

Therefore the maximization of likelihood function can be implemented by tracking the zeros of equation (4).

Conventionally, there are optimization schemes that can be used to maximize equation (1) or track the zeros for equation (4). One method used in synchronization is the steepest ascent method. Using the steepest ascent method, the iterative sequence is generated by: $\tau_{k+1}=\tau_k+\alpha_k f(\tau_k)$. The iteration proceeds from an initial guess $\tau_1$ for the maximizing point to successive points: $\tau_2, \tau_3, \ldots$, until some stopping condition is satisfied. This method has several disadvantages, however.

One of the primary disadvantages is that the rate of convergence can be relatively slow unless the initial approximation is sufficiently close to the solution. Further, the choice of step length $\alpha_k$ always results in a compromise between accuracy and efficiency, and finding the optimal step length is generally non-trivial and may increase computational complexity significantly. Finally this method is susceptible to noise. Noise and interference may result in divergence using the steepest ascent method.

The rate of convergence can be improved by using the Newton-Raphson method that makes use of the curvature information of the function. This method is a powerful and known numerical method of optimization. It involves generating the sequences $\{\tau_n\}$ defined by $\tau_{k+1}=\tau_k-f(\tau_k)/f'(\tau_k)$. However, rapid convergence occurs only when the initial approximation is close to the actual root, and many problems can occur if the initial approximation is not sufficiently close to the actual root. The computational intensity of the Newton-Raphson method is significantly large because the derivative $f'(\tau)$ ($2^{nd}$ derivative of likelihood function) needs to be evaluated in every iteration. Also, it is clear that the Newton-Raphson method can not be continued if $f'(\tau_k) \approx 0$ for some k. These properties make the Newton-Raphson method less attractive in the implementation of the symbol synchronization.

BRIEF SUMMARY OF THE INVENTION

It is an object of this invention to overcome the foregoing problems. In particular, it is an object of the invention to provide an apparatus, computer readable medium, transmission medium, and method for achieving symbol-timing synchronization of a received signal that are robust to noise, based on a maximum likelihood (ML) principle using a bisection technique.

It is a further object of the present invention to provide an apparatus, computer readable medium, transmission medium, and method for achieving symbol-timing synchronization of a received signal that will always converge to the optimal solution.

It is a yet a further object of the present invention to provide an apparatus, computer readable medium, transmission medium, and method for achieving symbol-timing synchronization of a received signal using a maximum likelihood (ML) principle and improving the linear convergence rate of bisection technique synchronization to second order by using the Aitken's $\Delta^2$ method without adding much computational complexity.

These and other objects may be achieved in accordance with the present invention.

In the present invention, the preamble of the data transmission is sampled and the set of samples obtained is processed using optimization algorithms to provide the ML timing estimate.

In a first part of the invention, optimization algorithms are used in the isolation of the desired optimal estimate from non-optimal extremes satisfying the same necessary condition, and provide the initial conditions for activating the binary search schemes. Next, a binary search is conducted to obtain the optimal timing estimate. In another embodiment of the invention, a more rapidly convergent sequence can be constructed from bisection sequence to obtain the ML symbol timing. Using the obtained symbol timing estimate, the ML carrier phase estimate can be computed explicitly, and a synchronization can be conducted accordingly.

BRIEF DESCRIPTION OF THE DRAWINGS

FIG. 1 is a chart illustrating a likelihood function and its derivative for a signal with $\tau/T=0.3$.

FIG. 2 is a diagram illustrating a "butterfly" for isolating an ML estimate from non-optimal extremes.

FIG. 3 is a flowchart illustrating a method for synchronizing a received signal using a maximum-likelihood principle based on a bisection technique.

FIG. 4 is a diagram depicting one embodiment of the present invention including a receiver, processor, and memory.

DETAILED DESCRIPTION OF THE PREFERRED EMBODIMENT

The performance of a maximum likelihood (ML) synchronizer is very close to the limit that can possibly be achieved in synchronization. The implementation of an ML synchronizer, however, involves extensive signal processing. Therefore the ML synchronizer is mostly used as a basis for performance comparison, usually for designing other synchronizers. The present invention presents a convergent, implementation structure using a bisection method, that can achieve the optimal solution for symbol timing, and this synchronization result ultimately is used in determining the ML carrier phase estimate and accordingly, in a synchronization process. According to the present invention, this synchronization process is employed in a communications apparatus (see FIG. 4).

In the present invention, to activate an effective search using the bisection method, a first key is to determine the interval in which the solution resides, that is, to find $[\tau_a, \tau_b]$ such that $f(\tau_a)$ and $f(\tau_b)$ have opposite signs. On the other hand, since $f(\tau)=0$ is the only necessary condition for the optimal estimate, not every root might be the solution. Therefore one aspect of the invention, Part 1 below, describes the algorithms and steps used in the present invention to isolate the desired optimal solution from other non-optimal extremes. Part 2 follows and describes the process for obtaining an iterative sequence using binary search to achieve the optimal timing estimate. Next, Part 3 describes, using the bisection iterative sequence from Part 2, how to construct a rapidly convergent sequence to obtain the ML symbol timing estimate.

Part 1

The timing parameter can be assumed within one symbol duration, and $$-\frac{T}{2} \leq \tau \leq \frac{T}{2}$$

is generally assumed. In this interval, there may be multiple roots to $f(\tau)=0$. The first task is to determine the one sub-interval that contains the root maximizing the desired objective function. A simple scheme can be developed to determine such a sub-interval.

At the output of the matched filter, the signal is sampled 2m times per symbol period, m samples with sampling instants $$\tau_k \text{ in } \left[-\frac{T}{2}, 0\right]$$

and the other m samples in $$\left[0, \frac{T}{2}\right].$$

In addition, sampling at the boundaries $$\tau = \pm \frac{T}{2}$$

can be conducted in order not to miss the solution. Using these signal samples, the values of $f(\tau_k)$ at these instants (k=1,2, . . . ,2m ) are computed. The underlying functions of $F(\tau)$ and $f(\tau)$ for a noise free scenario are shown in FIG. 1 as an illustration, from which, one can see that $f(\tau)$ has two roots within $$\left[-\frac{T}{2}, \frac{T}{2}\right],$$

one maximizing $F(\tau)$ and the other minimizing $F(\tau)$. An interval needs to be determined that only contains the root maximizing $F(\tau)$.

Based on the values of $f(\tau_k)$ computed from signal samples, one must first find one pair of extremes of $$f(\tau_k) \text{ in } \left[-\frac{T}{2}, 0\right],$$

and one pair in $$\left[0, \frac{T}{2}\right].$$

Let $(f_{max}^1, f_{min}^1)$ and $(f_{max}^2, f_{min}^2)$ be the obtained two pairs of the extremes for $\tau_k$ within $$\left[-\frac{T}{2}, 0\right] \text{ and } \left[0, \frac{T}{2}\right],$$

respectively, illustrated as "squares" in FIG. 1. From these four extremes, a pair of extremes can be determined such that the ML symbol-timing estimate is located between their sampling instants.

From the obtained two pairs of extremes, a flowchart is constructed as shown by FIG. 2 in which two paths emanate from each maximum and two paths merge to each minimum. For each path, a length is assigned as defined by $$l_{i,j} = \begin{cases} 0, & \text{if } f_{max}^i < 0 \text{ or } f_{min}^j > 0 \\ F(\tau_{i,j}), & \text{otherwise} \end{cases} \quad i, j = 1, 2 \quad (5)$$

where $$\tau_{i,j} = \frac{\tau_{max}^i + \tau_{min}^j}{2}, \, i, j = 1, 2 \quad (6)$$

In (6), $\tau_{max}^i$ and $\tau_{min}^j$ represent the sampling instants associated with $f_{max}^i$ and $f_{min}^j$, respectively.

The path with the longest length is the connection of the pair of extremes where only the root corresponding to the ML timing estimate locates between their sampling instants. For the scenario illustrated in FIG. 1, the algorithm chooses the path from $f_{max}^2$ to $f_{min}^2$ so that zero2 will be identified as the desired optimal estimate. Then the sampling instants corresponding to $f_{max}^2$ and $f_{min}^2$ are set as $\tau_a$ and $\tau_b$ respectively. Then, the bisection search algorithms are activated as discussed below in Part 2.

Part 2

The bisection search algorithms can be stated as follows,

INPUT: endpoints $\tau_a$, $\tau_b$; tolerance TOL; maximum number of iterations N.

OUTPUT: approximate solution $\hat{\tau}$

Step 1 Set i=1.

Step 2 while i<N do Steps 3–6.

Step 3 Set $\tau_i = \tau_a + \dfrac{\tau_b - \tau_a}{2}$.

Step 4 If $f(\tau_i) = 0$ or $\dfrac{\tau_b - \tau_a}{2} < TOL$ then

OUTPUT($\tau_i$); (Procedure completed successfully.)
Stop.

Step 5 Set i=i+1.

Step 6 If $f(\tau_a)f(\tau_b)>0$ then set $\tau_a=\tau_i$
else set $\tau_b=\tau_i$.

Step 7 OUTPUT ('N iterations are completed');
Stop.

Using the algorithms from Parts 1 and 2, an iterative sequence $\{\tau_k\}_{k=1}^N$ is obtained, which will always converge to ML timing estimate $\tau_{ML}$. Additionally, since the convergence rate of the bisection technique is linear, the Aitken's $\Delta^2$ process can be used to construct a more rapidly convergent sequence based on the original sequence without adding much computational complexity. The use of the Aitken's $\Delta^2$ process is discussed in Part 3 below.

Part 3

For the iterative sequence $\{\tau_k\}_{k=1}^N$ which is generated in Part 2 above, another sequence $\{\hat{\tau}_k\}_{k=1}^{N-2}$, can be constructed by $$\hat{\tau}_k = \tau_k - \frac{(\tau_{k+1} - \tau_k)^2}{\tau_{k+2} - 2\tau_{k+1} + \tau_k} \quad (7)$$

that will converge to $\tau_{ML}$ more rapidly than does the original sequence in the following sense.

$$\lim_{k \to \infty} \frac{\hat{\tau}_k - \tau_{ML}}{\tau_k - \tau_{ML}} = 0 \quad (8)$$

As soon as the ML timing estimate is obtained, the ML carrier phase estimate can be computed.

FIG. 3 is a diagram illustrating a method for achieving symbol-timing synchronization of a received signal based on a maximum-likelihood principle using a bisection technique. Steps 1–6 of FIG. 3 follow the process described in Parts 1–3 above.

In FIG. 4, this process is incorporated in the present invention into a communications apparatus. As stated earlier, in burst mode digital communication systems, data transmission is preceded by a preamble. A receiver, modem, or the present invention's communication apparatus, as shown in FIG. 4, must achieve synchronization with the signal transmission device before data can be demodulated. In the communications apparatus shown in FIG. 4, Signal A represents a received signal during preamble period. Signal A is transmitted by a transmission device (not shown), and received by the receiver 10 and stored in memory 20. Signal A is processed repeatedly by processor 30 using the algorithms and processes described in Parts 1–3 above. These algorithms and processes can be stored for example, as software residing on the memory 20 which is executed by the processor 30, or contained as part of the processor itself. The communications device is also envisioned with transmission means, which for example, can forward the synchronized data to other devices as Signal B.

Further, a transmission medium, which can be used for transmitting a program for executing the method described above, can include, for example, networks and digital broadcasting links.

The optimization methods described above are considered novel to carrier and symbol synchronization. The present invention provides an efficient, robust and implementable iterative scheme to obtain the maximum likelihood synchronizer. The iterative approach employed by the present invention is of particular applicability to digital technology, such as in burst mode digital communications.

While the present invention has been described with what presently is considered to be the preferred embodiments, the claims are not to be limited to the disclosed embodiments. It will be understood from the foregoing that the present invention can be implemented in either hardware or software. Variations can be made thereto without departing from the spirit and scope of the invention.

What is claimed is:

1. A method for synchronizing a received signal based on a maximum likelihood (ML) principle using a bisection technique comprising:

(a) directly sampling the received signal in a preamble period;

(b) obtaining an initial condition for initiating an iterative search by a bisection method based on isolating an optimal estimate of a partial derivative of a likelihood function from non-optimal extremes of a partial derivative of a likelihood function;

(c) performing said iterative search by a bisection method to obtain a bisection sequence;

(d) generating another iterative sequence using said bisection sequence, that converges to an ML timing estimate more rapidly;

(e) computing an ML carrier-phase using said ML timing estimate; and (f) synchronizing the received signal based on said ML timing estimate and said ML carrier-phase.

2. A method for synchronizing a received signal using a maximum likelihood (ML) principle based on a bisection technique according to claim 1, wherein an Aitken's $\Delta^2$ process is used to construct a rapidly convergent sequence based on said bisection sequence generated by said bisection method to increase a speed of convergence of said ML timing estimate.

3. A method for synchronizing a received signal based on a maximum likelihood (ML) principle using a bisection technique according to claim 1, wherein said received signal is stored in a memory.

4. A method for synchronizing a received signal based on a maximum likelihood (ML) principle using a bisection technique according to claim 1, wherein said steps (a)–(f) are performed by a processor.

5. A method for synchronizing a received signal based on a maximum likelihood (ML) principle using a bisection technique according to claim 1, wherein during said direct sampling, the signal is sampled 2m times per symbol period, m samples with sampling instants $$\tau_k \text{ in } \left[-\frac{T}{2}, 0\right]$$

and the other m samples in $$\left[0, \frac{T}{2}\right].$$

where T is the symbol period.

6. A method according to claim 5, further comprising sampling at boundaries where $$\tau = \pm \frac{T}{2}.$$

7. A method for synchronizing a received signal using a maximum likelihood (ML) principle based on a bisection technique according to claim 1, wherein said bisection method is based on an algorithm comprising:

Step 1 Set i=1.
Step 2 While i<N perform Steps 3–6.

Step 3 Set $\tau_i = \tau_a + \frac{\tau_b - \tau_a}{2}$.

Step 4 If $f(\tau_i) = 0$ or $\frac{\tau_b - \tau_a}{2} < TOL$ then

OUTPUT($\tau_i$); (Procedure completed successfully.)
Stop;
Step 5 Set i=i+1.
Step 6 If $f(\tau_a)f(\tau_b)>0$ then set $\tau_a=\tau_i$
    else set $\tau_b=\tau_i$.
Step 7 OUTPUT ('N iterations are completed');
Stop;
wherein $\tau_a, \tau_b$ are endpoints determined by said isolating an optimal estimate from non-optimal extremes, TOL is a tolerance, and N is a maximum number of iterations.

8. A computer readable medium, on which is stored a computer program for synchronizing a received signal based on a maximum likelihood (ML) principle using a bisection technique, said computer program storing instructions which, when executed, will perform the steps of:
    (a) directly sampling the received signal in a preamble period;
    (b) obtaining an initial condition for initiating an iterative search by a bisection method based on isolating an optimal estimate of a partial derivative of a likelihood function from non-optimal extremes of a partial derivative of a likelihood function;
    (c) performing said iterative search by a bisection method to obtain a bisection sequence;
    (d) generating another iterative sequence using said bisection sequence that converges to a ML timing estimate more rapidly;
    (e) computing an ML carrier-phase using said ML timing estimate; and
    (f) synchronizing the received signal.

9. A computer readable medium according to claim 8 wherein an Aitken's $\Delta^2$ process is used to construct a rapidly convergent sequence based on said bisection sequence generated by said bisection method to increase a speed of convergence of said ML timing estimate without adding much complexity.

10. A computer readable medium according to claim 8 wherein said received data is stored in a memory.

11. A communications apparatus for synchronizing a received signal based on a maximum likelihood (ML) principle using a bisection technique, comprising:
    (a) a receiver for receiving a signal;
    (b) a memory for storing said received signal, and synchronization process iterations; and
    (c) a processor, wherein said processor is used for:
        directly sampling the received signal in a preamble period;
        obtaining an initial condition for initiating an iterative search by bisection method based on isolating an optimal estimate of a partial derivative of a likelihood function from non-optimal extremes of a partial derivative of a likelihood function;
        performing said iterative search by a bisection method to obtain a bisection sequence;
        generating another iterative sequence using said bisection sequence that converges to a ML timing estimate more rapidly;
        computing an ML carrier-phase using said ML timing estimate; and
        synchronizing the received signal based on said ML timing estimate and said ML carrier-phase.

12. A communications apparatus for synchronizing a received signal based on a maximum likelihood (ML) principle using a bisection technique according to claim 11, wherein said processor also uses an Aitken's $\Delta^2$ process to construct a rapidly convergent sequence based on said bisection sequence generated by said bisection method to increase a speed of convergence of said ML timing estimate.

13. A transmission medium for transmitting a program for synchronizing a received signal based on a maximum likelihood (ML) principle using a bisection technique, the program comprising the steps of:
    (a) directly sampling the received signal in a preamble period;
    (b) obtaining an initial condition for initiating an iterative search by bisection method based on isolating an optimal estimate of a partial derivative of a likelihood function from non-optimal extremes of a partial derivative of a likelihood function;
    (c) performing said iterative search by bisection method to obtain a bisection sequence;
    (d) generating another iterative sequence using said bisection sequence that converges to a ML timing estimate more rapidly;
    (e) computing an ML carrier-phase using said ML timing estimate; and
    (f) synchronizing the received signal based on said ML timing estimate and said ML carrier-phase.

14. A transmission medium for transmitting a program for synchronizing a received signal using a maximum likelihood (ML) principle based on a bisection technique according to claim 13, wherein an Aitken's $\Delta^2$ process is used to construct a rapidly convergent sequence based on said bisectional sequence generated by said bisection method to increase a speed of convergence of said ML timing estimate.

15. A transmission medium for transmitting a program for synchronizing a received signal based on a maximum likelihood (ML) principle using a bisection technique according to claim 13, wherein said received signal is stored in a memory.

16. A transmission medium for transmitting a program for synchronizing a received signal based on a maximum likelihood (ML) principle using a bisection technique according to claim 13, wherein said steps (a)–(f) are performed by a processor.

* * * * *